United States Patent
Murphy et al.

(10) Patent No.: US 9,207,947 B1
(45) Date of Patent: Dec. 8, 2015

(54) FAST BOOT IN HYBRID DRIVES

(75) Inventors: Robert Dale Murphy, Boulder, CO (US); Robert William Dixon, Longmont, CO (US); John Frederic Wehman, Superior, CO (US)

(73) Assignee: Seagate Technology LLC, Cupertino, CA (US)

( * ) Notice: Subject to any disclaimer, the term of this patent is extended or adjusted under 35 U.S.C. 154(b) by 350 days.

(21) Appl. No.: 13/600,035

(22) Filed: Aug. 30, 2012

(51) Int. Cl.
G06F 9/44 (2006.01)
G06F 11/14 (2006.01)
G06F 21/57 (2013.01)

(52) U.S. Cl.
CPC .......... *G06F 9/4401* (2013.01); *G06F 11/1417* (2013.01); *G06F 21/575* (2013.01)

(58) Field of Classification Search
CPC ... G06F 3/068; G06F 9/4401; G06F 11/1417; G06F 21/575
USPC .......................................................... 713/2
See application file for complete search history.

(56) References Cited

U.S. PATENT DOCUMENTS

| | | |
|---|---|---|
| 5,581,785 A | 12/1996 | Nakamura |
| 6,336,161 B1 | 1/2002 | Watts |
| 6,662,267 B2 | 12/2003 | Stewart |
| 6,968,450 B1 | 11/2005 | Rothberg |
| 7,100,040 B2 | 8/2006 | Fortin |
| 2006/0294357 A1 | 12/2006 | Choo |
| 2008/0005462 A1 | 1/2008 | Pyeon |
| 2010/0217966 A1* | 8/2010 | Shim ................................ 713/2 |
| 2011/0154008 A1* | 6/2011 | Weng et al. ...................... 713/2 |
| 2012/0303942 A1* | 11/2012 | Peacock ........................... 713/2 |

* cited by examiner

*Primary Examiner* — Jaweed A Abbaszadeh
*Assistant Examiner* — Alyaa T Mazyad
(74) *Attorney, Agent, or Firm* — Cesari & Reed LLP; Kirk A. Cesari; Christian W. Best

(57) ABSTRACT

The disclosure is related systems and method for improved boot and resume from hibernate times in hybrid drives. In one embodiment, a device may comprise an interface circuit to communicate with a host device, a first nonvolatile data storage medium, and a controller configured to monitor the interface circuit for a trigger event and pin data associated with read requests to the first nonvolatile data storage medium during a first specific duration in response to the trigger event. Another embodiment may be a method comprising receiving a trigger event, monitoring a duration since the trigger event, retrieving data from a nonvolatile cache memory, retrieving data from a disc memory when the data is not in the nonvolatile cache memory, and pinning the data retrieved from the disc memory to the nonvolatile cache memory.

23 Claims, 5 Drawing Sheets

FAST BOOT IN HYBRID DRIVES

BACKGROUND

Disc drive data storage mediums can have a large data capacity and can retain data without access to a power supply. For these reasons, data storage devices often use a disc drive to store the data necessary to start up (or "boot") the device or resume from hibernation, since the data will not be lost when the device is depowered. However, disc drives may be slow to reach an operating state when a device is powered on or resumes from hibernation, resulting in a delay in productivity for a user. Therefore, systems and methods are needed to improve boot and resume from hibernate speeds in data storage devices.

SUMMARY

A device may comprise an interface circuit to communicate with a host device, a first nonvolatile data storage medium, and a controller configured to monitor the interface circuit for a trigger event and pin data associated with read requests to the first nonvolatile data storage medium during a first specific duration in response to the trigger event.

In another embodiment, an apparatus may comprise a control circuit adapted to pin data associated with read requests during a first specific duration to a nonvolatile cache memory in response to a trigger event.

Another embodiment may be a method comprising receiving a trigger event, monitoring a duration since the trigger event, retrieving data from a nonvolatile cache memory, retrieving data from a disc memory when the data is not in the nonvolatile cache memory, and pinning the data retrieved from the disc memory to the nonvolatile cache memory.

DETAILED DESCRIPTION

In the following detailed description of the embodiments, reference is made to the accompanying drawings which form a part hereof, and in which are shown specific embodiments by way of illustration and not limitation. It is to be understood that other embodiments may be utilized and structural changes may be made without departing from the scope of the present disclosure.

Volatile data storage mediums, such as many types of random access memory (RAM) including dynamic RAM (DRAM), require power to retain stored data.

Nonvolatile data storage mediums, on the other hand, can retain data even without a power source. Nonvolatile data storage mediums can include most types of magnetic storage, such as hard discs; most types of read-only memory (ROM); and a number of other types of memory, such as electronically-erasable programmable ROM (EEPROM), Flash memory, and some types of solid state drives (SSDs).

Booting involves loading operating systems or other data needed to run a device from a nonvolatile data storage medium when the device is turned on. Similarly, many devices can enter a low-power hibernate mode, and resuming from hibernation likewise may involve loading data from a nonvolatile data storage medium. Hibernate data, sometimes called resume data, may comprise data needed to run a device as well as user programs and files that were running at the time the device entered the hibernate state.

Magnetic data storage mediums such as hard discs may often be used to store boot or hibernate data, but disc drives are slow to initialize on start up, and can have a relatively low data access rate. Storage mediums such as Flash SSDs are faster to initialize and have a higher data access rate, but can be more expensive than disc drives. Certain data storage devices, sometimes called "hybrid drives," involve both a disc drive and a faster non-volatile memory (NVM) such as Flash, and can be more economically feasible than a large capacity Flash drive. Hybrid drives can achieve faster boot and resume from hibernate performance using the built-in NVM than may be possible with a disc-based memory alone.

Figure 1:
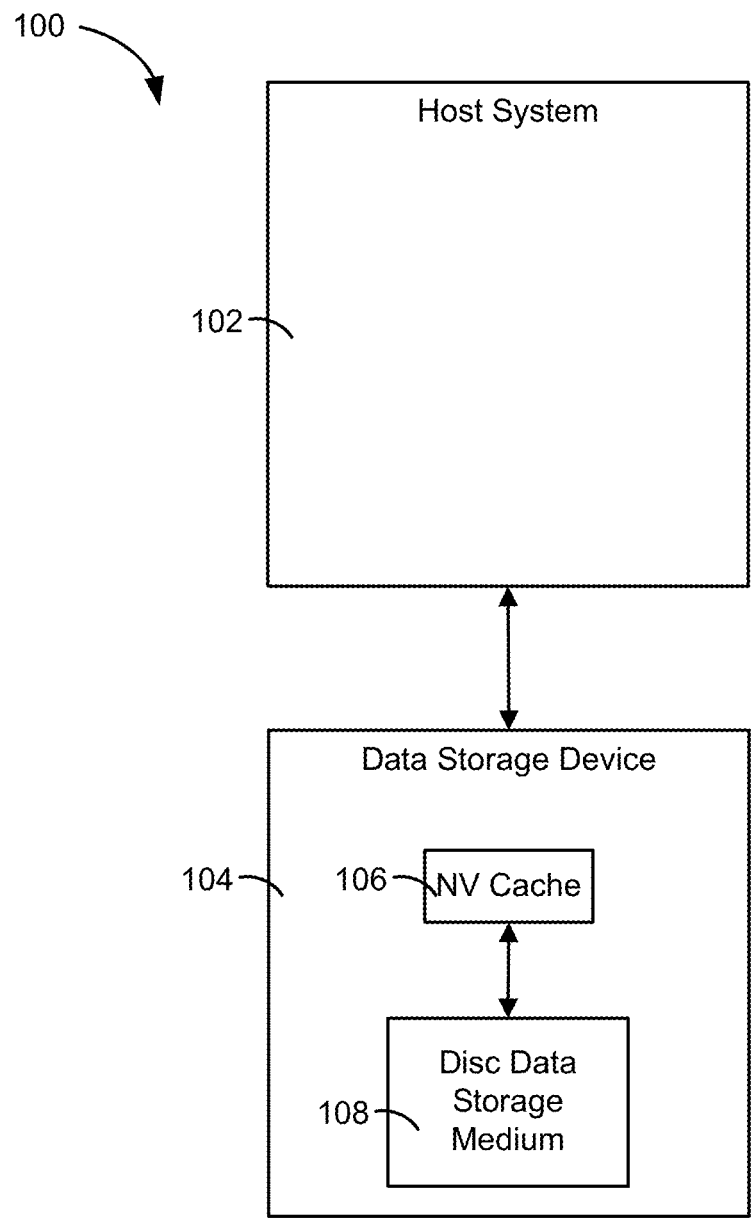
FIG. 1 is a diagram of an illustrative embodiment of a system for fast boot in hybrid drives.

Turning now to FIG. 1, a diagram of an illustrative embodiment of a system for fast boot in hybrid drives is shown and generally designated 100. The system 100 may include a host 102 and a data storage device (DSD) 104. The host 102 may also be referred to as the host system, host device, or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, all of the elements described for a DSD herein may be contained in the host 102, with no need for a separate DSD 104. In another embodiment, the DSD 104 can be a stand-alone device not connected to a host 102, or the host 102 and DSD 104 may both be part of a single unit, with the elements of the present disclosure distributed between them.

The DSD 104, and in some embodiments the host 102 or both, may include a main memory, such as a disc data storage medium 108, as well as a nonvolatile cache (NV Cache or NVC) 106, such as Flash memory. Boot or hibernate data may be loaded into the NV Cache 106 to improve boot times of the host 102, the data storage device 104, or both. In some embodiments, the host 102 may boot or resume from hibernate by accessing data from the DSD 104. For example, operating system data for the host 102 may be stored on the DSD 104, and therefore the host 102 utilizes the disc drive 108 and NV Cache 106 of the DSD 104 in order to boot or resume from hibernate.

Figure 2:
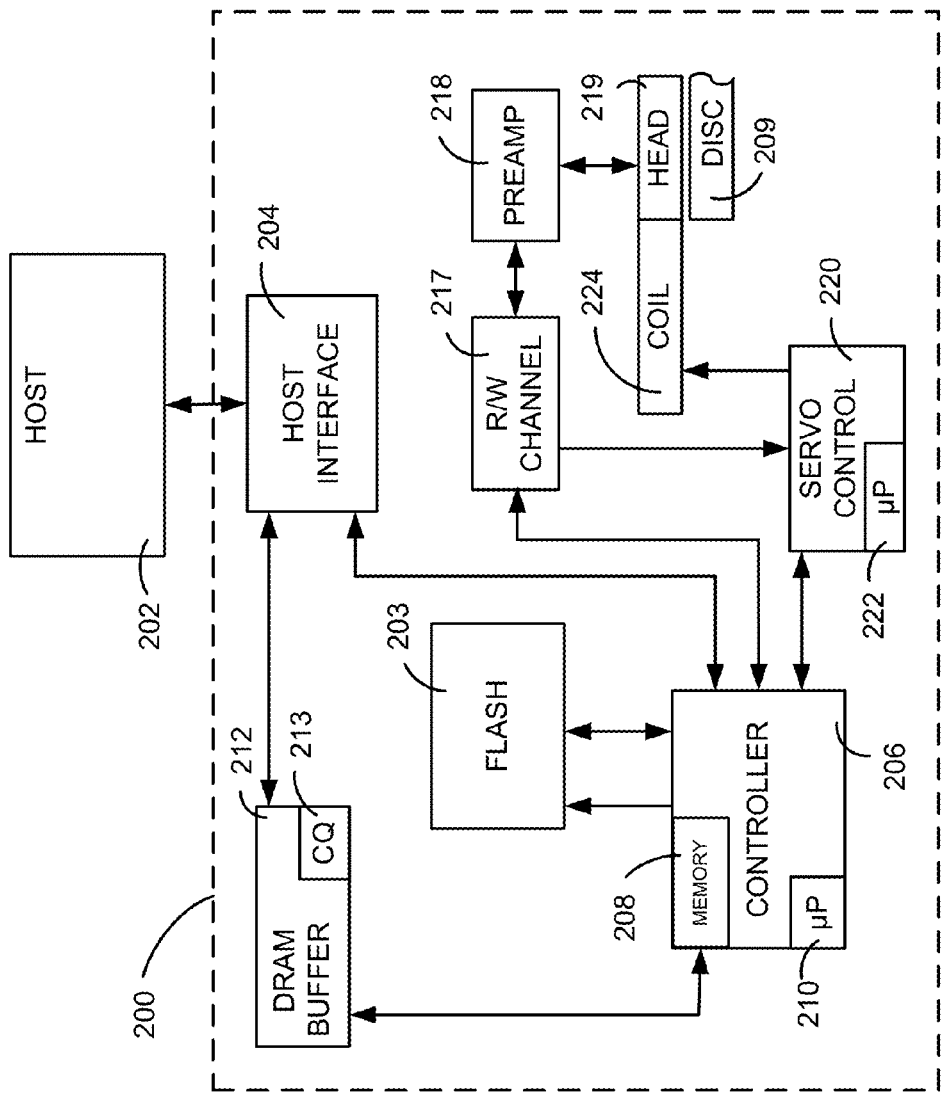
FIG. 2 is another diagram of an illustrative embodiment of a system for fast boot in hybrid drives.

FIG. 2 is a diagram of another illustrative embodiment of a system for fast boot in hybrid drives, generally designated 200. Specifically, FIG. 2 provides a functional block diagram of a hybrid data storage device (DSD) 200. In some embodiments, the elements and components depicted in the DSD 200 may be implemented in the host 202. The DSD 200 may be a data storage device such as the device 104 shown in FIG. 1. The data storage device 200 can communicate with a host device 202 (such as the host system 102 shown in FIG. 1) via a hardware/firmware based host interface circuit 204 that may include a connector (not shown) that allows the DSD 200 to be physically removed from the host 202. The buffer 212 can temporarily store user data during read and write operations and can include a command queue (CQ) 213 where multiple pending access operations can be temporarily stored pending execution. A nonvolatile solid state memory 203, such as Flash memory, can be included for additional cache or buffer memory, or to provide additional addressable data storage for the DSD 200. The DSD 200 can include a programmable controller 206 with associated memory 208 and processor 210.

Further, FIG. 2 shows the DSD 200 can include a read/write (R/W) channel 217, which can encode data during write operations and reconstruct user data retrieved from disc(s) 209 during read operations. A preamplifier/driver circuit (preamp) 218 can apply write currents to the head(s) 219 and provides pre-amplification of readback signals. A servo control circuit 220 may use servo data to provide the appropriate current to the coil 224 to position the head(s) 219 over the disc(s) 209. The controller 206 can communicate with a processor 222 to move the head(s) 219 to the desired locations on the disc(s) 209 during execution of various pending commands in the command queue 213.

Figure 3:
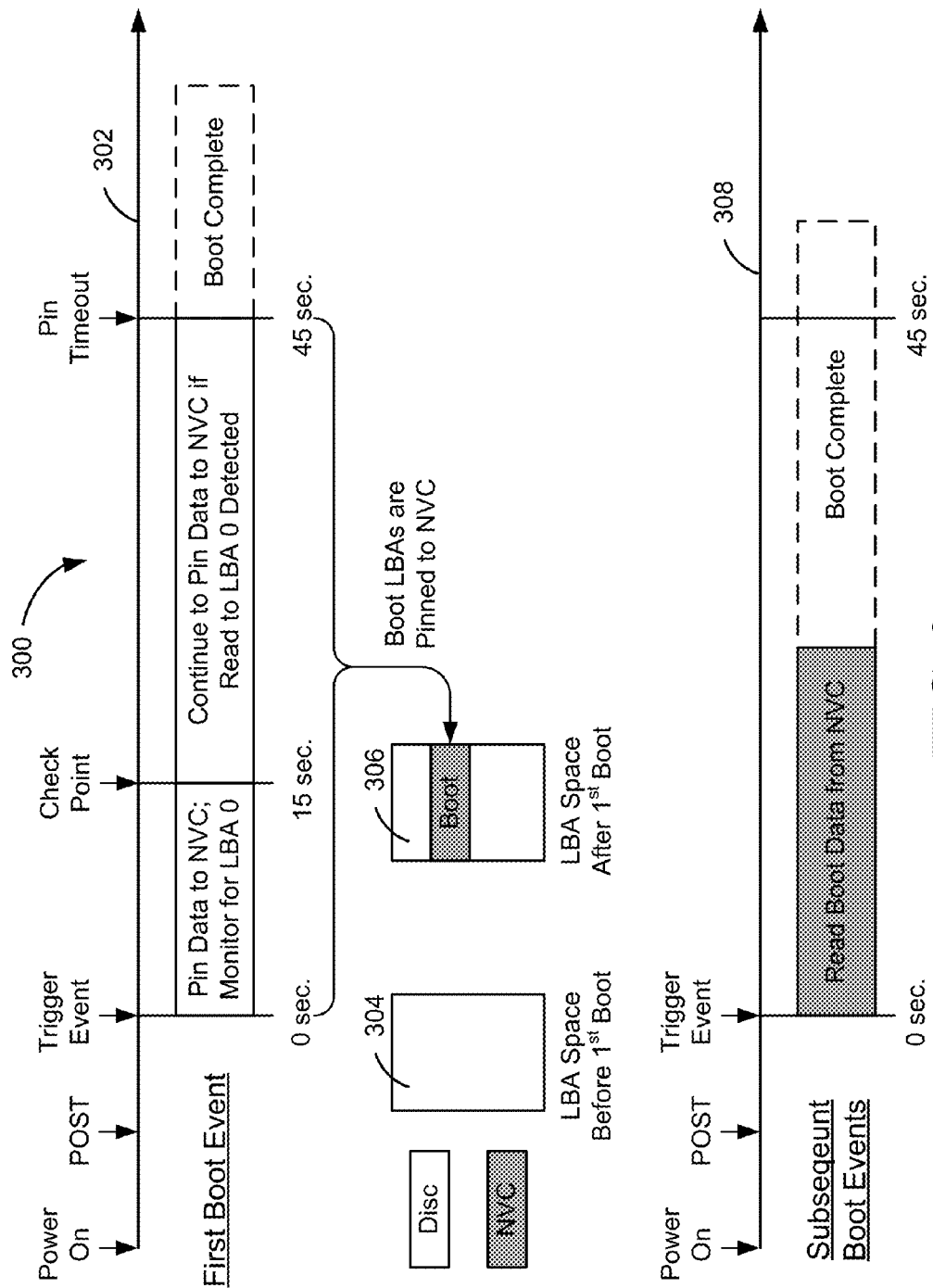
FIG. 3 is a chart of an illustrative embodiment of a system for fast boot in hybrid drives.

FIG. 3 depicts a chart of an illustrative embodiment of a system for fast boot in hybrid drives, generally designated 300. A timeline 302 shows a first boot event on a device, such as the data storage device (DSD) 200 from FIG. 2, booting according to the present disclosure. The first point on the timeline 302, designated "Power On," is when power is first applied to the DSD. The next point, designated "POST," represents a power-on self-test, which can be a set of pre-boot routines run by many electronic devices, e.g. for running initial tests set by a manufacturer. These POST routines may be stored in firmware or included as hardware, such as built in to logic circuits.

The DSD next watches for a "Trigger Event," which may indicate that a boot event is in progress. The Trigger Event may be a command or sequence of commands received by the DSD, a system status notification, or some other event which may notify the DSD that a boot is occurring. For example, a host may send a Comreset command to a connected device to initialize a link with the device. Comreset commands are often used to initialize or reset a connected device. Other example triggers may be initial device power-on, a security unlock command, or routines to identify a connected device.

Once a Trigger Event is detected, the DSD may begin "pinning" all data requested by a host to the non-volatile cache (NVC) if the data is not already pinned to the NVC. On a first boot event, the NVC may be empty, and requested boot data may be read from a disc data storage medium and pinned to the NVC. This may involve waiting for a disc memory to initialize and spin up for reading, as well as the potentially slower data read times for a disc memory. On subsequent boots, most or all of the requested data may be pinned to the NVC, thereby removing the need to access the disc memory or wait for the disc memory to initialize during boot.

The DSD may continue pinning data for a specific duration, such as until the point on the timeline 302 labeled "Check Point." The DSD may be configured to monitor for a specific occurrence or pre-determined command prior to the Check Point. In the illustrative embodiment of FIG. 3, this Check Point is shown to be 15 seconds after the Trigger Event. In other embodiments, the Check Point may be other designated lengths of time, or a designated number of commands received from the host. In the depicted embodiment, the occurrence or command the DSD monitors for is a read request to logical block address (LBA) 0, indicating that the host may be loading operating system or similar boot data. A device may be configured to monitor for other commands or events that may indicate a boot is in progress.

If the DSD does not detect the pre-determined command within 15 seconds, such as the read to LBA 0, the device may stop pinning data to the NVC. In such an event, a boot is likely not in progress and the data that had been pinned prior to the "Check Point" can be overwritten. The device may mark those data blocks as not pinned and available for overwriting or erasure according to the functioning of the particular cache.

If the DSD does detect the pre-determined command within 15 seconds, the device may continue pinning read data until a designated duration or "Pin Timeout," as indicated on the timeline 302. The Pin Timeout may be a length of time, or some other indicator, such as a number of commands received by the DSD, a signal that boot has completed, or some terminal trigger event such as an "end boot" command or a read or write to a specific data address. In the embodiment depicted in FIG. 3, the Pin Timeout is 45 seconds after the Trigger Event. In other embodiments, Pin Timeout may be after 30 seconds, a minute, 45 commands, or some other designated occurrence.

In some embodiments, the DSD may pin more or less data to the NVC than is needed for booting. For example, if booting completes within 30 seconds after the Trigger Event, and the DSD is configured to pin data for 45 seconds, the DSD may also pin the first data a user typically accesses after boot up. This would not only improve boot performance of a device on subsequent boots, but improve a user's experience immediately after the boot as well. If less data is pinned than is needed for a full boot on the initial boot event, enough data may be pinned that the NVC can supply boot data until the disc memory is initialized and spun up on subsequent boot events. This would keep more NVC space free, while still substantially improving boot performance.

Logical block addresses (LBAs) are memory addresses that are not tied to any one physical memory location. For example, data saved to LBA 10 may not be saved to any set physical memory location (e.g. track, sector, or disc of a data storage device), and LBA 10 may "move" to different physical memory blocks over time. The physical memory block to which each LBA is associated may be stored on a data storage device, such as in a look-up table. A host device may only know that boot data is stored in LBAs 0 through 15, for example, and a controller for the data storage device may determine the physical storage location for the data, including whether the data has been pinned to a cache. As depicted in FIG. 3, the entirety of LBA space before a first boot event 304 may be stored on disc memory. After running a first boot event, the LBAs containing boot data can be pinned to the NVC for faster access, at 306.

A subsequent boot timeline 308 depicts subsequent boot events. Power On may still occur first, followed by POST routines. The DSD may then receive a Trigger Event as described above, at 0 seconds. However, unlike in the first boot event, the requested data is already pinned to the NVC, and can be quickly retrieved pursuant to the read requests. Waiting for the disc memory to initialize and spin up may not be necessary, significantly shortening the boot up process. Pinning additional data to the NVC may not be necessary.

In some embodiments, the DSD may recognize a Trigger Event, such as a Comreset signal, after the first boot event. If the data requested after the Trigger Event is not already pinned, the DSD may begin pinning data as shown on the first boot event timeline 302. This way, if the necessary boot data has changed or increased the NVC will be updated with the new or changed boot data. If the specific occurrence, such as a read to LBA 0, does not occur before the Check Point time, the newly pinned data may be "unpinned," and be made available for overwriting as described above.

Instructions and control for the described boot up process may be distributed between a host device and a data storage device in a variety of ways. In one embodiment, a data storage device may comprise a nonvolatile cache, a disc memory, and a controller for issuing commands to the storage mediums, while a host may comprise a circuit configured to send a boot notification to the storage device controller and direct that boot data be retrieved from the cache, or retrieved from the disc and pinned to the cache when the boot data is not already in the cache. In other embodiments, the host may only request data from certain LBAs and the storage device controller will issue the commands to the appropriate storage medium and control any necessary pinning to cache.

Figure 4:
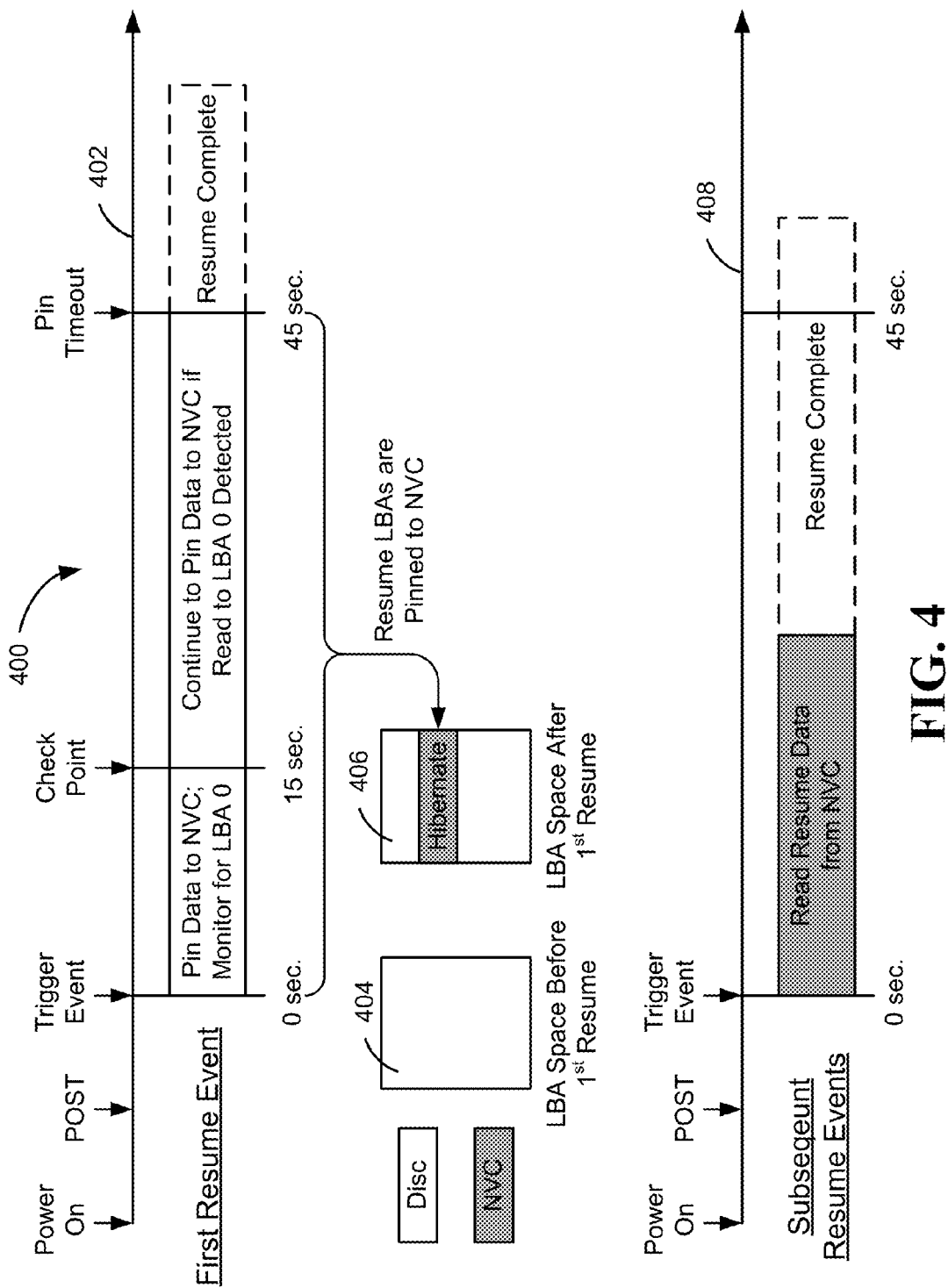
FIG. 4 is a chart of another illustrative embodiment of a system for fast boot in hybrid drives.

FIG. 4 is a chart of another illustrative embodiment of a system for fast boot in hybrid drives, generally designated 400. Specifically, FIG. 4 depicts timelines for resuming from hibernation. During hibernation, a device may save its current state, such as the contents of a volatile RAM, to a nonvolatile memory such as a disc data storage medium. Upon resuming, the data is retrieved and reloaded into RAM. In some embodiments, additional data may be required for resuming from hibernation than what was in RAM. When a device is entering hibernation mode, it may be configured to store the current operating state to the nonvolatile cache (NVC) memory, allowing for a more rapid resume from hibernate than if the data was stored to a slower data storage medium such as a disc memory. If additional data is required that is not stored in the NVC, the data can be pinned to the NVC on a first resume from hibernate event, allowing subsequent resumes to complete more quickly.

The first resume event 402 functions similarly to a first boot event, and the discussion for FIG. 3 can provide additional details. At Power On, power is returned to a hibernating device. POST routines may be performed, and the DSD can monitor for a Trigger Event which may indicate that a resume event is in progress. As with booting, the Trigger Event may be a command or sequence of commands received by the DSD, a system status notification, or some other event which may notify the DSD that a resume is occurring. For example, a host may send a Comreset command to a connected device to initialize a link with the device. Other example triggers may be a security unlock command, or routines to identify a connected device. In some embodiments, the Trigger Event may be the same for booting and resuming.

Once a Trigger Event is detected, the DSD may begin "pinning" all data requested by a host to the non-volatile cache (NVC), assuming the data is not already stored in the NVC. On a first resume event, some requested resume data may be read from a disc data storage medium and pinned to the NVC. This may involve waiting for a disc memory to initialize and spin up for reading, as well as the potentially slower data read times for a disc memory. On subsequent resumes, most or all of the requested data may be pinned to the NVC, thereby removing the need to access the disc memory during resume.

The DSD may continue pinning data until the point on the timeline 402 labeled "Check Point." The DSD may be configured to monitor for a specific occurrence or command prior to the Check Point. In the illustrative embodiment of FIG. 4, this Check Point is shown to be 15 seconds after the Trigger Event. In other embodiments, the Check Point may be other designated lengths of time, or a designated number of commands received from the host. In the depicted embodiment, the occurrence or command the DSD monitors for is a read request to logical block address (LBA) 0, indicating that the host may be loading operating system or similar resume data. Depending on implementation, the specific occurrence or command may be the same for resuming and for booting.

In this embodiment, if the DSD does not detect the read to LBA 0 within 15 seconds, the device may stop pinning data to the NVC. If the DSD does detect a read to LBA 0 within 15 seconds, the device may continue pinning read data until a designated "Pin Timeout", as indicated on the timeline 402. The Pin Timeout for a resume may be the same or different than for booting.

As depicted in FIG. 4, the entirety of LBA space before a first resume event 404 may be stored on disc memory. After running a first resume event, the LBAs containing resume data can be pinned to the NVC for faster access, at 406. In some embodiments, before a device enters hibernate mode it may pin all hibernate data to the NVC, so that LBAs containing resume data are pinned to the cache at the first hibernate event, and before the first resume event. Much of the data stored in RAM at each hibernate event is likely to change, so the hibernate data in the NVC may change with each hibernate event. In some embodiments, data from the RAM may simply be stored to the NVC and not pinned, since the data is likely to change on subsequent hibernations. This may allow the RAM data to be retrieved from the NVC quickly on a resume, without tying up cache space with pinned data.

A subsequent resume timeline 408 depicts subsequent resume events. Power On may still occur first, followed by POST routines. The DSD may then receive a Trigger Event as described above, at 0 seconds. However, unlike in the first resume event, the requested data is already pinned to the NVC, and can be quickly retrieved pursuant to the read requests. As with subsequent boot events described along with FIG. 3, additional or changed resume data may be pinned to the NVC during subsequent resumes to keep the pinned resume data up-to-date.

Figure 5:
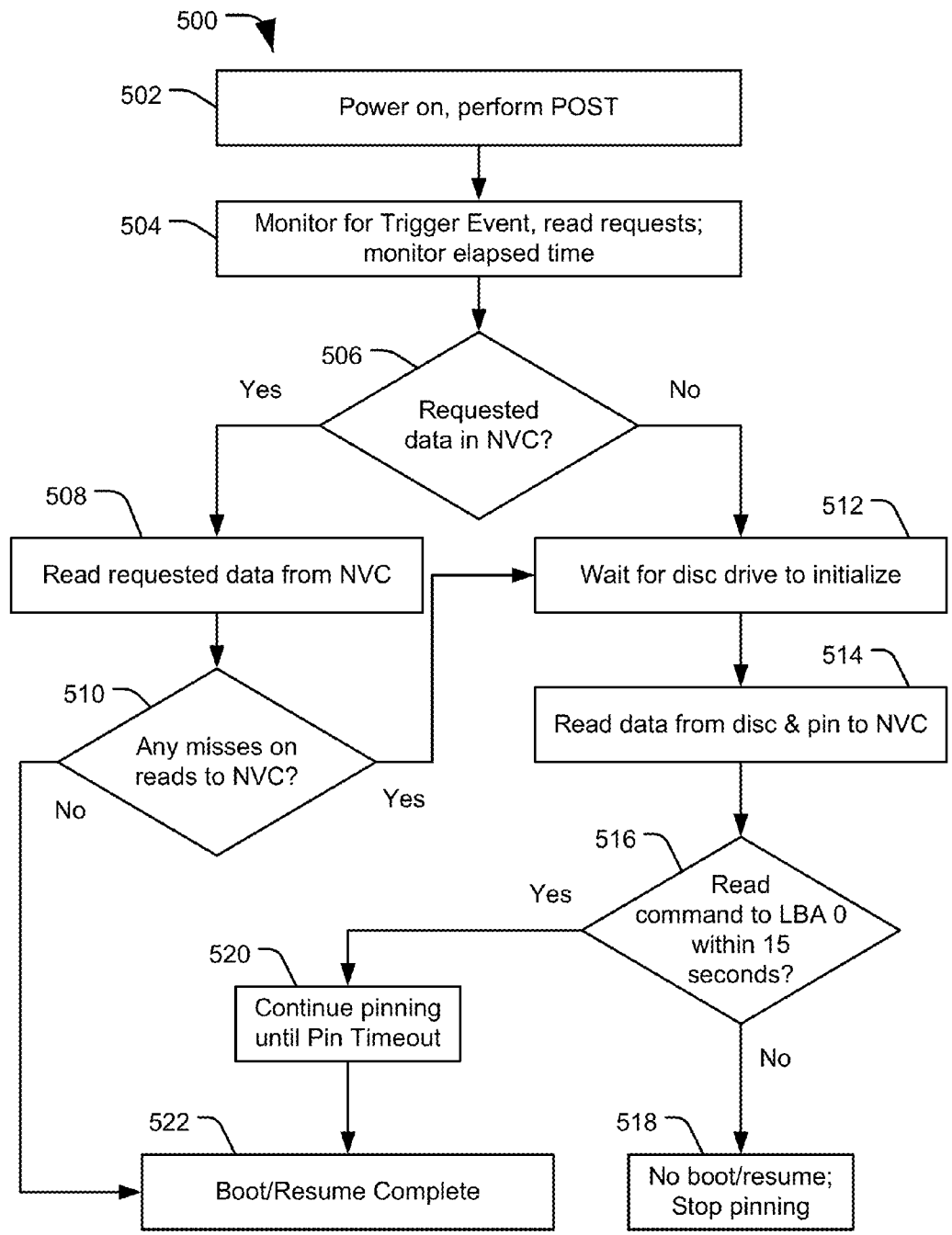
FIG. 5 is a flowchart of an illustrative embodiment of a method of a system for fast boot in hybrid drives.

FIG. 5 is a flowchart of an illustrative embodiment of a method of a system for fast boot in hybrid drives, generally designated 500. A data storage device (DSD) is powered on, and performs a power-on self-test (POST), at 502. In some embodiments, no POST may be performed. The DSD monitors for a Trigger Event and data read requests, at 504. A Trigger Event may be any of the events discussed above that may signal a boot event or resume from hibernate event, such as a Comreset signal from a host device. After the Trigger Event, the DSD monitors data read requests and time elapsed since the Trigger Event. In some embodiments, the DSD may monitor the number of commands received from a host rather than an elapsed time.

The DSD determines if the requested data is already stored or pinned in a non-volatile cache of the DSD, at 506. If the requested data is in the NVC, the data is retrieved from the NVC pursuant to the read requests, at 508. The DSD continues to monitor read requests for any "misses," or requested data not in the NVC, at 510. If there are no misses, the boot or resume completes at 522.

If the requested data is not in the NVC at 506 or 510, the DSD waits for the disc drive data storage medium to initialize for data reads, at 512. The requested data is retrieved from the disc and pinned to the NVC, at 514. The DSD determines if there has been a read command for LBA 0 within 15 seconds since the Trigger Event, at 516. In some embodiments, the DSD may watch for signals or commands different from a read to LBA 0. Some embodiments may check for a predefined number of commands rather than an elapsed period of time.

If a read to LBA 0 was detected within 15 seconds from the Trigger Event, the DSD may continue pinning read data to the NVC until a Pin Timeout event, at 520. Pin Timeout may be a length of time since the Trigger Event, a designated number of commands, a "boot or resume complete" signal, or some other even. The Boot or resume is then complete, at 522.

If no read to LBA 0 was detected within 15 seconds from the Trigger Event, the DSD may stop pinning data to the NVC, at 518. If no read to LBA 0 occurs within 15 seconds, it is unlikely a boot or resume from hibernate event is in progress. Data pinned to the NVC within 15 seconds since the Trigger Event may be "unpinned," and those storage locations in the NVC may be made available for erasure or overwriting with other data.

In accordance with various embodiments, the methods described herein may be implemented as one or more software programs running on a computer processor or controller. In accordance with another embodiment, the methods described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods described herein. Further, the methods described herein may be implemented as a computer readable medium including instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
   an interface circuit to communicate with a host device;
   a first nonvolatile data storage medium;
   a controller configured to:
      monitor the interface circuit for a trigger event;
      during a first specific duration in response to the trigger event:
         pin data associated with read requests to the first nonvolatile data storage medium;
         monitor the interface circuit for a pre-determined command indicating a boot sequence;
         continue to pin data associated with the read requests to the first nonvolatile data storage medium during a second specific duration when the pre-determined command is received during the first specific duration; and
      stop pinning data associated with the read requests to the first nonvolatile data storage medium when the pre-determined command is not received during the first specific duration.

2. The device of claim 1 further comprising:
   a second nonvolatile data storage medium having a slower access speed than the first nonvolatile data storage medium;
   the controller further configured to:
      control reading data associated with read requests from the first nonvolatile data storage medium in response to the trigger event; and
      pin data associated with read requests to the first nonvolatile data storage medium from the second nonvolatile data storage medium for the first specific duration and the second specific duration when the data is not contained in the first nonvolatile data storage medium.

3. The device of claim 2 wherein the first nonvolatile data storage medium is a Flash memory and the second nonvolatile data storage medium is a hard disc memory.

4. The device of claim 2 wherein the first specific duration and the second specific duration are lengths of time since the trigger event.

5. The device of claim 2 wherein the first duration and the second duration are numbers of commands received from the host since the trigger event.

6. The device of claim 2, the controller further configured to unpin the data associated with the read requests from the first nonvolatile data storage medium when the pre-determined command is not received during the first specific duration.

7. The device of claim 2 wherein the trigger event is a reset signal from the host device.

8. The device of claim 2 wherein the trigger event is a status notification received from the host indicating a boot process.

9. The device of claim 2 wherein the trigger event is one of the events from the group consisting of device power-on, a security unlock command, or an attempt from the host to identify the device.

10. The device of claim 2 wherein the pre-determined command is a read request to logical block address 0.

11. The device of claim 2 further comprising:
    a random access memory; and
    the controller further configured to copy hibernate data from the random access memory to the first nonvolatile data storage medium prior to the device entering a hibernate mode.

12. The device of claim 11 wherein the trigger event is a status notification received from the host indicating a resume from hibernation.

13. An apparatus comprising:
    a control circuit adapted to:
       monitor for a trigger event;
       during a first specific duration in response to the trigger event:
          pin data associated with read requests to a nonvolatile cache memory;
          monitor for a pre-determined command indicating a boot sequence;
          continue to pin data associated with the read requests to the nonvolatile cache memory during a second specific duration when the pre-determined command is received during the first specific duration; and stop pinning data associated with the read requests to the nonvolatile cache memory when the pre-determined command is not received during the first specific duration.

14. The apparatus of claim 13 wherein the control circuit is further adapted to:
   direct that data associated with read requests be read from the nonvolatile cache memory after the trigger event;
   pin the data associated with the read requests to the nonvolatile cache memory from a disc memory during the first specific duration in response to the trigger event when the data is not found in the nonvolatile cache memory.

15. The apparatus of claim 14 further comprising:
   an interface circuit to communicate with a host device;
   the nonvolatile cache memory; and
   the disc memory.

16. The apparatus of claim 15 wherein the specific duration is a number of commands received from the host device.

17. A method comprising:
   receiving a trigger event;
   monitoring a duration since the trigger event;
   during a first duration from the trigger event:
      retrieving data from a nonvolatile cache memory;
      retrieving data from a disc memory when the data is not in the nonvolatile cache memory;
      pinning the data retrieved from the disc memory to the nonvolatile cache memory;
   when a designated command is received during the first duration indicating a boot operation, pinning data retrieved from the disc memory to the nonvolatile cache memory for a second duration from the trigger event; and
   when the designated command is not received during the first duration, stop pinning data retrieved from the disc memory to the nonvolatile cache memory.

18. The method of claim 17 wherein the first duration and the second duration are lengths of time.

19. The method of claim 17 wherein the first duration and second duration are numbers of commands received.

20. The method of claim 17 wherein the second duration ends when a terminal trigger event is detected.

21. The method of claim 17 further comprising unpinning the data retrieved from the disc memory during the first duration if the designated command is not received during the first duration.

22. The method of claim 17 wherein the designated command is a read command to logical block address 0.

23. The method of claim 17 wherein the trigger event is selected from the group consisting of a power-on event, a notification indicating a boot process, a notification indicating a resume from hibernate, a device reset signal, a security unlock command, or a routine to identify a device.

* * * * *